Figure 5:
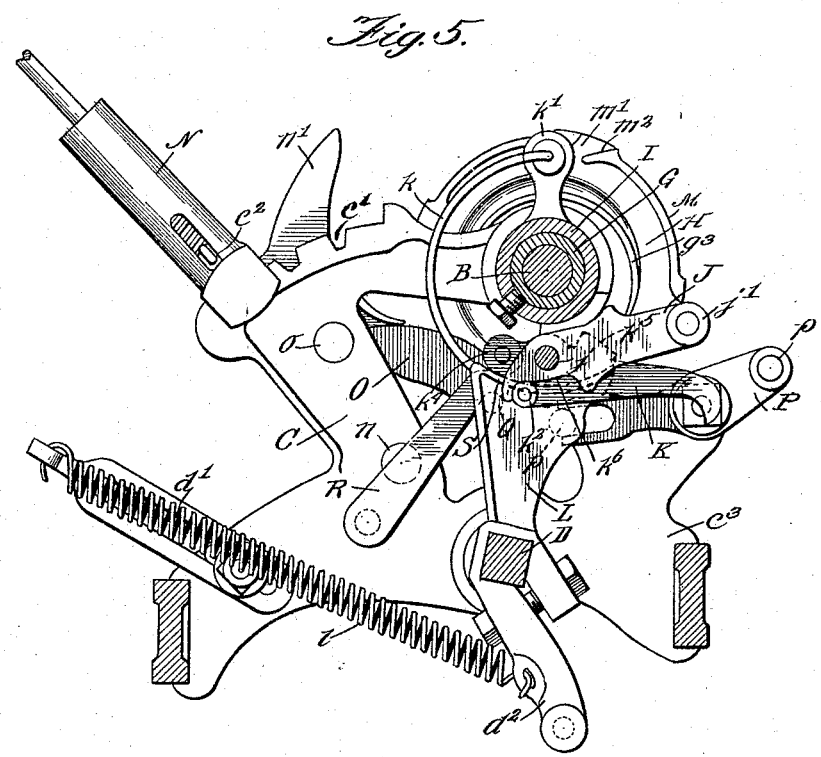

J. TEDELL.
CORN PLANTER.
APPLICATION FILED MAY 5, 1910.
1,192,138.
Patented July 25, 1916.
5 SHEETS—SHEET 1.
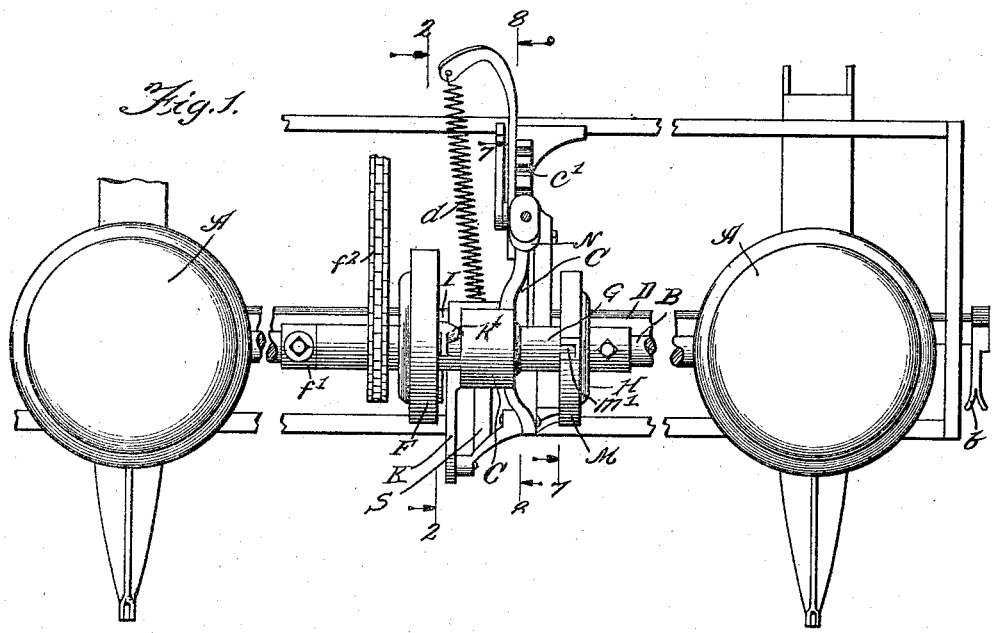
Fig. 1.
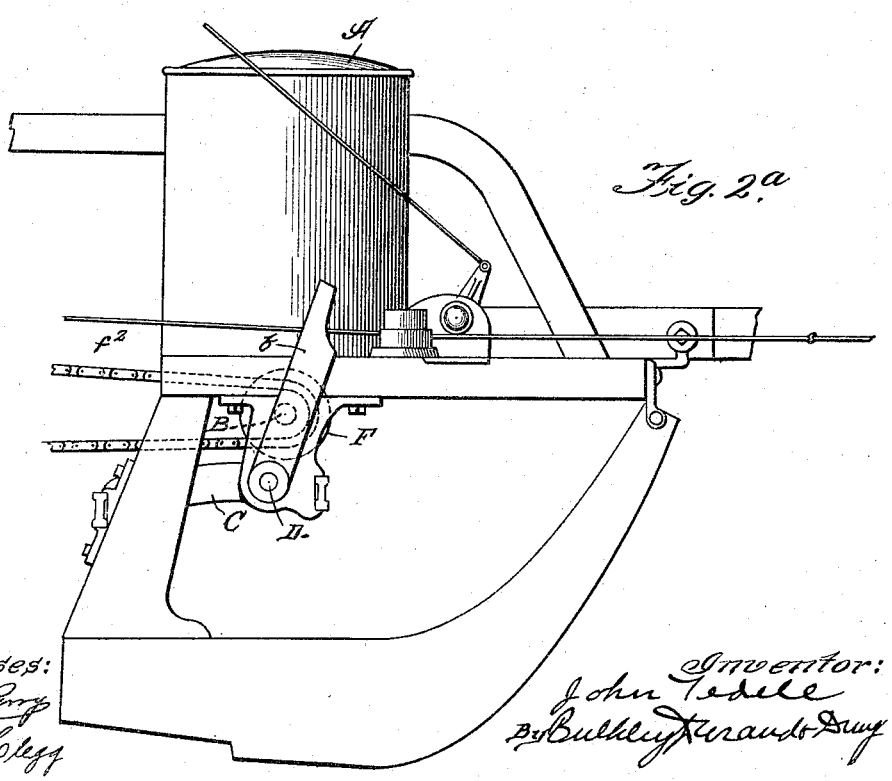
Fig. 2ª.
Witnesses:
Inventor:
John Tedell
By Bulkley, Durand & Drury
Attys J. TEDELL.
CORN PLANTER.
APPLICATION FILED MAY 5, 1910.
1,192,138.
Patented July 25, 1916.
5 SHEETS—SHEET 2.
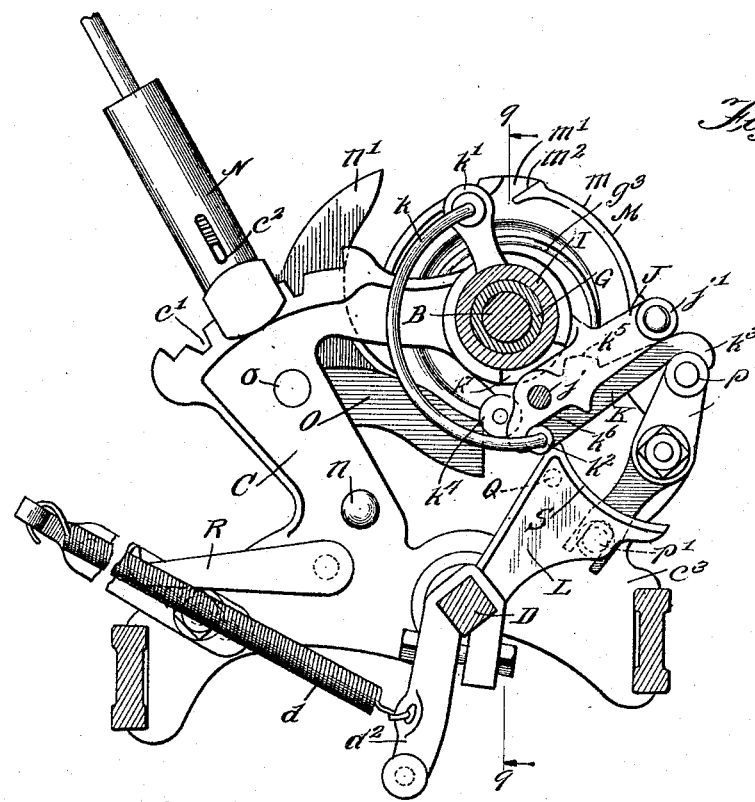
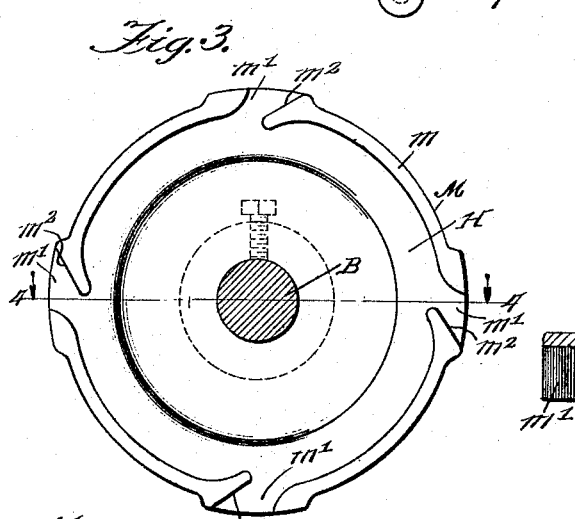
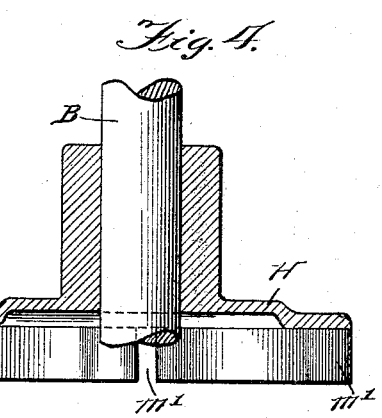

J. TEDELL.
CORN PLANTER.
APPLICATION FILED MAY 5, 1910.

1,192,138.

Patented July 25, 1916.
5 SHEETS—SHEET 3.

Witnesses:
Ira D. Perry
E. H. Clegg

Inventor:
John Tedell
By Culkley Girauld & Day
Attys

J. TEDELL.
CORN PLANTER.
APPLICATION FILED MAY 5, 1910.

1,192,138.

Patented July 25, 1916.
5 SHEETS—SHEET 4.

Witnesses:

Inventor:
John Tedell
By Buckley Durand Lang
Attys.

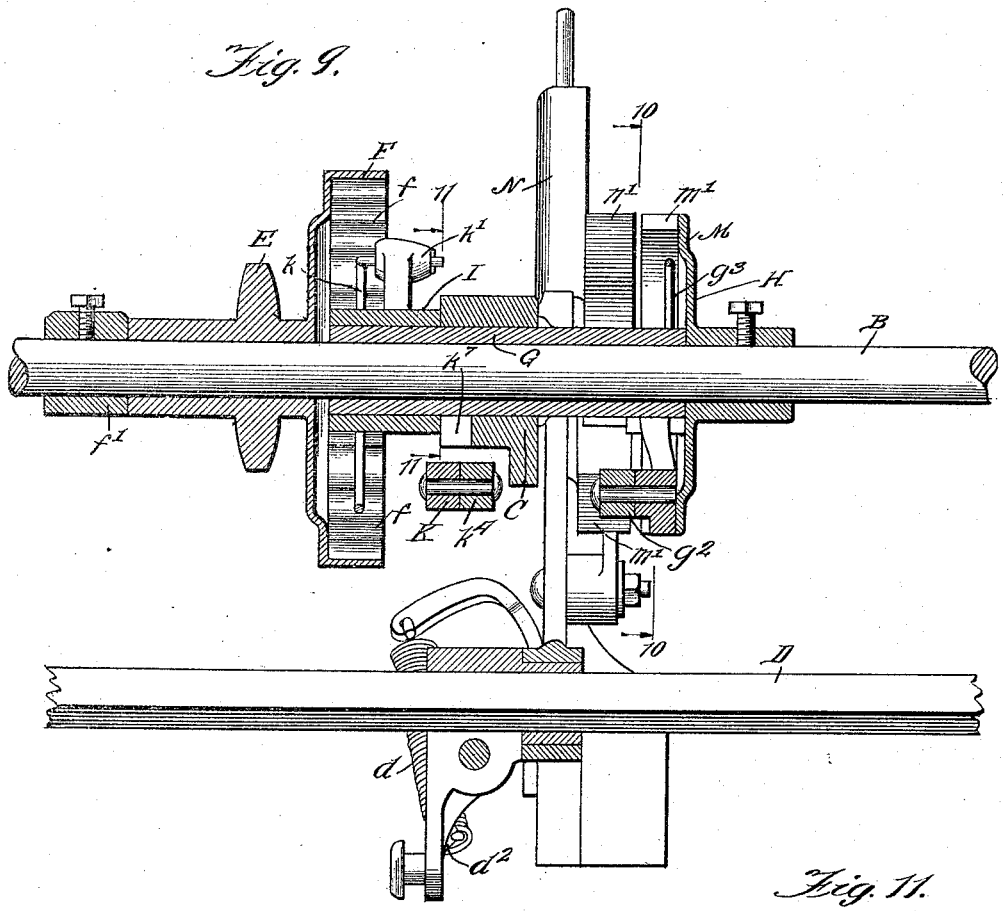
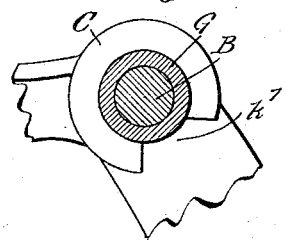
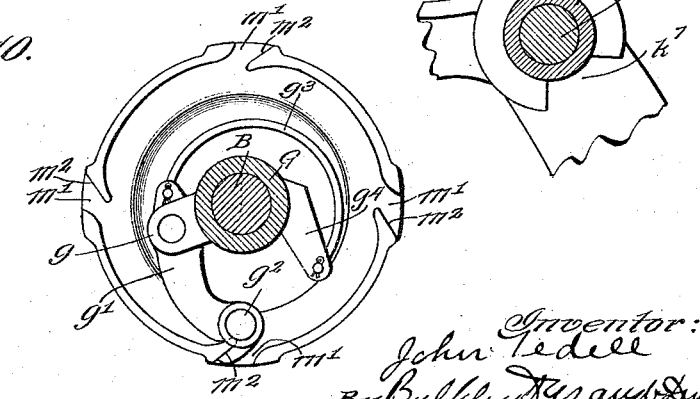

UNITED STATES PATENT OFFICE.

JOHN TEDELL, OF MOLINE, ILLINOIS, ASSIGNOR TO ROCK ISLAND PLOW COMPANY, OF ROCK ISLAND, ILLINOIS, A CORPORATION OF ILLINOIS.

CORN-PLANTER.

1,192,138.  Specification of Letters Patent.  Patented July 25, 1916.

Application filed May 5, 1910. Serial No. 559,465.

*To all whom it may concern:*

Be it known that I, JOHN TEDELL, a citizen of the United States of America, and resident of Moline, Rock Island county, Illinois, have invented a certain new and useful Improvement in Corn-Planters, of which the following is a specification.

My invention relates to corn planters of that kind in which the seed-dropping mechanisms are operated by power derived from either one or both of the ground wheels. In a planter of this kind the check-row devices are employed for operating a clutch which controls the transmission of power from the ground wheel to the seed-dropping mechanism. When a knot on the check-row wire strikes the fork or check-row arm at the side of the planter, the clutch is then operated to close the power-transmitting connection, and the seed-dropping mechanism is then operated to drop the required number of seeds or kernels of corn. At a predetermined point in the operation, the clutch is automatically opened, to discontinue the transmission of power, and the seed-dropping mechanisms then remain inactive until another knot is encountered on the check-row wire. Corn planters of this kind have also been provided with an auxiliary clutch or connection for varying the number of kernels to be dropped by the seed mechanisms in each hill.

The principal object of my invention is to provide, in a corn planter of this kind, an improved auxiliary clutch mechanism or device for varying the number of kernels to be dropped in each hill, of such character that the parts will not be subject to undue wear, and will not be liable to break or get out of order.

It is also an object to provide an improved mechanism for varying the number of kernels for each hill, in combination with a main clutch mechanism for automatically starting and stopping the seed shaft, when the machine is used for check-row planting.

To the foregoing and other useful ends, my invention consists in matters hereinafter set forth and claimed.

Figure 6:
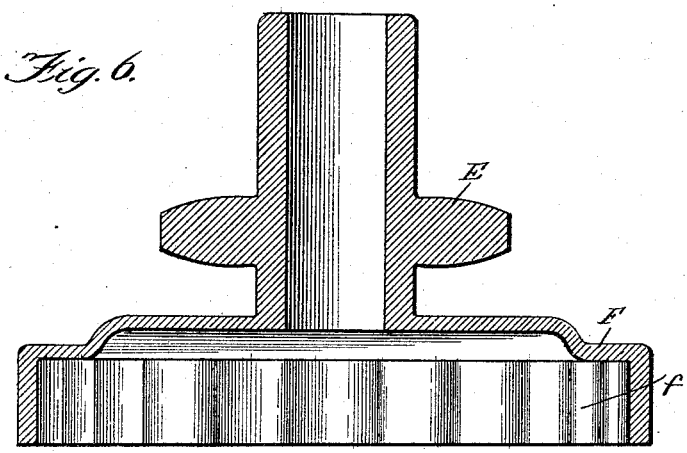
Figure 7:
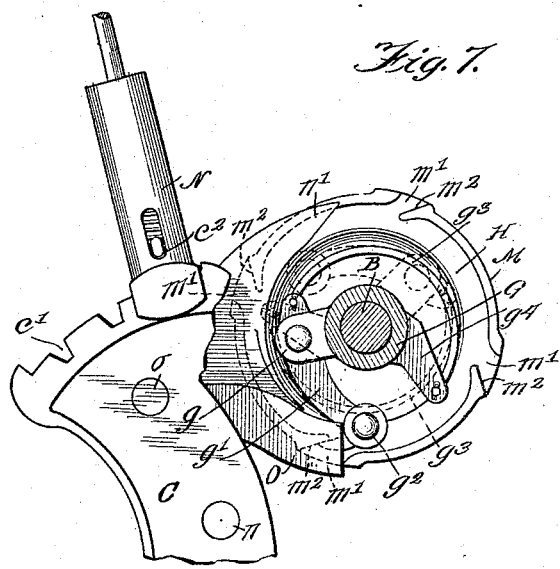
Figure 8:
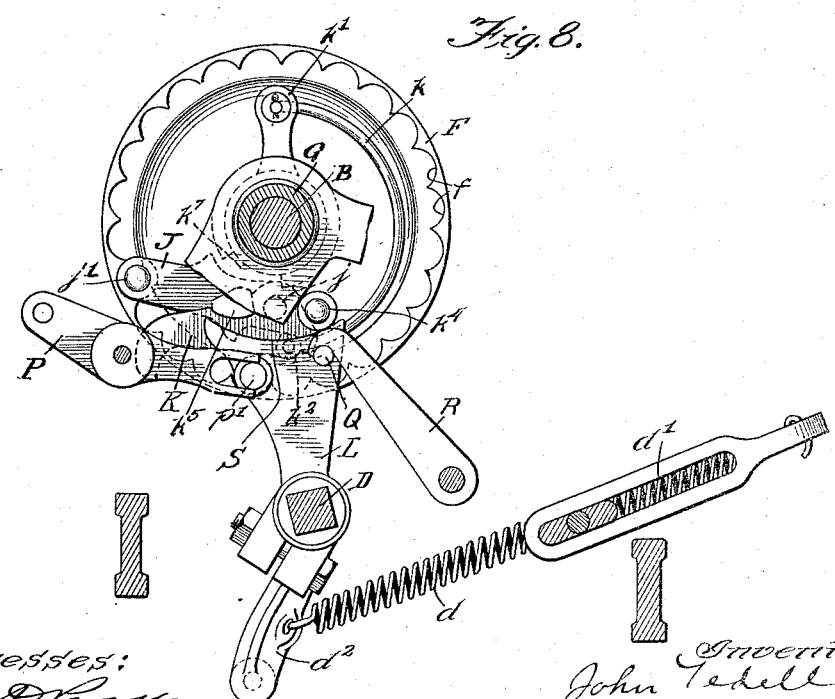

In the accompanying drawings,—Figure 1 is a plan view of the forward portion of a corn planter embodying the principles of my invention, showing the seed boxes connected by the rotary seed-shaft, the main and auxiliary clutches, and showing one of the check-row forks, which are located at opposite ends of the rock shaft by which the transmission of power is controlled, intermediate portions of the said shafts being shown broken away for convenience of illustration. Fig. 2 is an enlarged section on line 2—2 in Fig. 1. Fig. 2ᵃ is a side elevation of the forward portion of the planter. Fig. 3 is an enlarged face view or side elevation of the auxiliary clutch wheel, which is keyed to the rotary seed-shaft. Fig. 4 is a section on line 4—4 in Fig. 3. Fig. 5 is a view similar to Fig. 2, but showing the mechanism locked in condition for drilling. Fig. 6 is an enlarged longitudinal section of the main clutch wheel, which is integral with the sprocket which is driven by the chain that leads to the ground wheel or to the axle of the machine, depending upon the character of the power-transmitting connection. Fig. 7 is an enlarged section on line 7—7 in Fig. 1. Fig. 8 is an enlarged section on line 8—8 in Fig. 1, the mechanism being shown in the same condition illustrated in Fig. 5, which is the condition necessary for drilling. Fig. 9 is a section on line 9—9 in Fig. 2. Fig. 10 is an enlarged section on line 10—10 in Fig. 9. Fig. 11 is a section on line 11—11 in Fig. 9.

As thus illustrated, the corn planter may be of any suitable known or approved construction, being provided with the usual seed boxes A, the latter being provided with seed mechanisms of any suitable kind, which are driven by the usual transverse, rotary seed-shaft B. This shaft is, of course, supported in suitable bearings at its ends, and in a bearing C at its center, whereby it is free to rotate. The rock shaft D is provided at each end with the usual check-row forks $b$, which latter are adapted to engage the knots on the check-row wires in the usual and well known manner. This rock shaft is held in its normal position by the spring $d$, which has one end adjustably connected to the frame of the planter by an adjustable connection $d'$, and its other end connected with the rock shaft by means of an arm $d^2$, which arm is rigidly clamped upon the said rock shaft. The seed shaft B is provided with a sprocket wheel E that is integral with the clutch wheel F, which latter has the curved or circular notches $f$ formed around its inner circumference, as shown more clearly in Fig. 8. The said sprocket wheel and clutch wheel are free to rotate on the seed shaft B, and are held in place by a collar $f'$ which is secured to said shaft. The said sprocket wheel is driven by a sprocket chain $f^2$ that leads to a sprocket on the axle of the machine, or to one of the ground wheels, or to any other element that may be driven by one or both of the ground wheels. The sleeve G rotates in the bearing C and incloses the rotary seed shaft B, the said sleeve being long enough to extend from the wheel F to the auxiliary clutch wheel H, which latter is keyed to the seed shaft. The collar I is keyed upon the sleeve G in any suitable manner, and rotates therewith, said collar being disposed between the wheel F and the bearing C, in the manner illustrated. The dog J is pivoted at $j$ upon an ear formed on the sleeve or collar I, and is provided at its outer end with a roll $j'$ adapted to engage the notches $f$ on the clutch member F. An arm or lever K is also pivoted at $j$, upon the collar I, and is connected by a spring $k$ with another ear of lug $k'$ on the collar I. This spring is adapted to hold the round portion $k^2$ of the lever K either side of a line drawn from the center of the ear or lug $k'$ through the axis or pivot $j$, whereby the said spring is adapted to hold the lever K in either one of two positions. The lever K is provided with a hook-shaped outer portion $k^3$, and at its inner end with a roll $k^4$. The said lever K is also provided with a lug $k^5$, which is adapted to ride upon and around the periphery of the bearing C, whereby during such movement the dog J is locked in engagement with the clutch member F. This is by reason of the fact, it will be seen, that the round portion $k^2$ is adapted to engage a depression $k^6$ on the lower edge of the dog J. When the portion $k^2$ is at one end of this depression $k^6$, as shown in Fig. 2, then the dog is locked in engagement with the said clutch member. However, when the portion $k^2$ is thrown or moved to the other or outer end of this depression $k^6$, then the dog J is moved out of engagement with the clutch member F, as will hereinafter more fully appear. When the lug $k^5$ reaches the notch $k^7$ in the lower periphery of the bearing C, the lever K can then be operated to cause the dog J to disengage the clutch member F, thus disconnecting the transmission of power from the sprocket wheel E to the shaft B, as will also hereinafter more fully appear.

The rock shaft D is provided with a cam arm L that is adapted to engage the roll $k^4$, when the shaft is rocked by the striking of a knot on the check-row wire. This causes the portion $k^2$ to engage at one end of the depression $k^6$, as shown in Fig. 2, thereby throwing the dog J into engagement with the clutch member F. Such action also moves or rotates the clutch member and the sleeve G for a short distance, or until the hook-shaped portion $k^3$, and other parts, have assumed the positions shown in Fig. 5. The spring $l$ then retracts the rock shaft and the check-row forks at the ends thereof, and the cam L, to their normal positions, as shown in Fig. 2.

There is an auxiliary clutch mechanism, consisting of the wheel or clutch member M that is secured in any suitable manner to the shaft B, as shown in Fig. 9. This clutch member is provided with a peripheral flange $m$, which latter is provided with four openings $m'$, each opening being formed at one side thereof with a beveled engaging portion $m^2$, as shown more clearly in Figs. 3 and 10. The sleeve G is provided with an ear $g$, upon which is pivoted the hook-shaped dog $g'$, the hook-shaped portion of which latter is adapted to engage in the openings $m'$, and to bear upon the inclined or beveled portions $m^2$, as shown in Fig. 10. This dog is provided with a roll $g^2$, and is held normally in engagement with the clutch member M by means of a spring $g^3$. This spring, it will be seen, connects the shorter end of the dog $g'$ with an ear or lug $g^4$ on the sleeve G. Thus, the hook-shaped outer end portion of the dog $g'$ is adapted to slide or ride upon the inner surface of the flange $m$ until it encounters one of the openings $m'$. Then the dog causes the clutch member M to rotate, and this in turn causes the shaft B to rotate. It is in this manner that the power is transmitted from the sleeve G to the shaft B to operate the seed-dropping mechanisms at each side of the machine. Upon the bracket portion $c$ of the bearing C a lever N is pivoted at $n$, the said lever being provided with a rigid cam-shaped portion $n'$ adapted to be engaged by the roll $g^2$. Another cam O is pivoted upon the casting or bracket $c$ at $o$, and is controlled by the movements of the lever N, the arrangement being such that when this lever is moved away from the shaft B the cam O will move downward, and vice versa when the lever is moved toward the shaft. Thus, the cam portion O is always in correct position to engage the roll $g^2$ at the proper time to disengage the dog $g'$ from the clutch member M, except when the lever is moved to the limit of its outward movement. It will also be seen that by means of the cam $n'$, the curved or concave front surface of which is adapted to engage the roll $g^2$, the reëngagement of the dog $g'$ with the clutch member M can be delayed for a variable length of time, so that the said dog will skip one or more of the openings $m'$ in the clutch member M, thereby making it possible to vary the extent of rotation of the seed shaft. In this way, and by causing the said dog to skip one of said openings, the shaft will only be rotated for three-quarters of a complete rotation, thus causing the seed-dropping mechanism to place but three kernels of corn in each hill; or, if desired, the lever N can be moved to a position to cause the cam $n'$ to compel the dog $g'$ to skip two of the openings $m'$, thus effecting a dropping of only two kernels in each hill. Thus, either two, three or four kernels can be dropped in each hill by simply adjusting the lever N either toward or away from the seed-shaft. For this purpose the casting $c$ is provided with a rack or segment $c'$ adapted to be engaged by a locking device $c^2$, of any suitable or well understood character, on the said lever. It will be understood, however, that any suitable mechanism can be employed for locking the lever N in its various positions. Upon the portion $c^3$ of the said casting there is pivoted an arm P, which is provided with a roll $p$ adapted to engage the hook-shaped portion $k^3$ of the dog K in the manner shown in Fig. 2. This arm or lever P is held in proper position by reason of a connection $p'$, of any suitable character, with the cam arm L, as shown in Fig. 2. When the portion $k^3$ strikes the roll $p$, the portion $k^2$ is forced to the outer end of the cam depression $k^6$ in the dog J, thereby disengaging said dog from the cam member F, and causing an interruption of the transmission of power from the ground wheel to the seed-shaft. The seed-shaft will then remain stationary until another knot on the check-row wire strikes the fork at the end of the rock shaft, at which time the rocking of the said rock shaft D will again cause the arm L to engage the roll $k^4$, thus again throwing the dog J into engagement with the clutch member F. The shaft will then continue to rotate until the portion $k^3$ strikes the roll $p$, which operation opens the main clutch mechanism in the manner already described. At about the same time, or shortly after, the roll $g^2$ strikes the cam O, causing the dog $g'$ to be retracted or drawn backward from the opening $m'$ in which it was held in locking engagement by the spring $g^3$. In this way, it will be seen, the disengagement of the dog $g'$ from the clutch member M is not accompanied by any undesirable friction or grinding action between the two, and consequently no objectionable or undue wear occurs, and breakage is not liable to take place. When the lever N is thrown to the limit of its movement away from the shaft B, the cam O then assumes such a position that it does not cause the dog $g'$ to disengage from the clutch member M. Under such conditions, four kernels of corn will be dropped in each hill, as the shaft will be given a full rotation each time the fork at the end of the rock shaft strikes a knot on the check-row wire.

When the lever N is placed at its middle or center position, as shown in Fig. 2, then the dog $g'$ will skip one of the openings $m'$, with the result that only three kernels will be dropped in each hill. Then, if the arm or lever N be placed in its other position, which is nearest the seed-shaft, the cams O and $n'$ will cause the dog $g'$ to skip two of the openings $m'$, with the result that only two kernels of corn will be dropped in each hill. Thus, the starting of the seed-shaft is delayed to a greater or less extent to vary the number of kernels for each hill of corn. This, it will be seen, is substantially different from some of the old schemes, which involve the tripping out of the clutch either sooner or later to vary the rotation of the seed-shaft. In other words, certain old arrangements involve the stopping of the seed-shaft in a variable manner, just ahead of or prior to the opening of the main clutch; but with my improved arrangement the two clutches rotate to the same point, and are opened practically at the same time. Furthermore, with my improved arrangement, the auxiliary clutch does not close simultaneously with the closure of the main clutch, but is arranged to close subsequent to the closure of the main clutch, in a variable manner, whereby the seed-shaft is given a variable extent of rotation. I find this is more satisfactory than the old method of starting the seed-shaft immediately upon the closure of the main clutch, or practically as soon as the rock-shaft is operated by the check-row wire. With my improved method, whereby the starting of the seed-shaft is delayed for a variable length of time after the actuation of the check-row mechanism, I find that the whole mechanism operates with more certainty and in a more satisfactory manner. Also the feature of having the hook-shaped portion $k^3$ strike the stationary or positive stop $p$, to open the clutch, is productive of more certainty of operation, as it absolutely prevents the mechanism from failing to stop the transmission of power at the proper time. With some of the old constructions, it was found that the clutches would not always open at the proper time, and that the mechanism would continue to operate for several rotations of the shaft, especially if the machine was working under a heavy load. With my improved arrangement, however, the main clutch is compelled to open at the proper time, and it will always do this regardless of the conditions under which the machine is working.

The machine can be used for drilling, as well as for check-row planting. For this purpose, the arm L is provided with a pin or lug Q adapted to be engaged by the hook R, which latter is pivoted upon the casing c in the manner shown in Figs. 2 and 5. When the hook R is forced into engagement with the pin or lug Q, and the lever N is in a position as shown in Fig. 5, then the mechanism is in condition for drilling, as with the parts held in such position, the hook $k^3$ cannot engage the roll $p$, as the latter is at this time held out of the path of the hook-shaped portion $k^3$ by reason of the connection $p'$, in the manner shown in Fig. 5. At this time the curved cam surface S of the arm L is in position to be engaged and traveled over by the roll $k^4$ on the arm K, and consequently the dog J is at such time held in locking engagement with the clutch member F. In this way the seed-shaft will continue to revolve and the dropping of the seed will be continuous, as is the case when the machine is used for drilling.

From the foregoing it will be seen that I provide improved and highly efficient main and auxiliary clutch mechanisms for use on a check-row planter in which the power for operating the seed-dropping mechanisms is derived from either one or both of the ground wheels.

For the broader purpose of my invention, and so far as the variation of the number of kernels in each hill is concerned, the main clutch may be of any suitable or approved construction, or may not be used at all, without departing from the spirit of my invention, although when a main clutch is used, I prefer the one shown and described.

What I claim as my invention is:

1. In a planting machine, a rotary seed-shaft, a clutch wheel secured upon said shaft, said clutch wheel provided with a peripheral flange having openings therein, a pivoted dog working inside of said clutch wheel, adapted to engage and disengage said openings, and means for causing said pivoted dog to skip one or more of said openings before engaging therewith.

2. In a planting machine, a rotary seed-shaft, a clutch wheel secured upon said shaft, said wheel provided with a peripheral flange having openings therein, a rotary element which is loose on said shaft, a dog pivoted on said element, adapted to engage and disengage said openings, a spring for forcing the dog into the openings, means for disengaging the dog from the openings, and means for causing the dog to skip one or more of said openings before engaging therewith.

3. In a planting machine, a rotary seed-shaft, a clutch wheel secured upon said shaft, said clutch wheel being provided with a peripheral flange having openings therein, a rotary element which is loose on said shaft, a dog pivoted upon said element, adapted to move in and out of said openings, about an axis parallel but non-coincident with said shaft, means for engaging said dog to disengage the latter from said openings, and a spring controlling said dog, said dog being movable backward in a direction opposite the forward rotation of the seed-shaft to disengage it from any one of said openings.

4. In a planting machine, a rotary-seed-shaft, a clutch member secured thereon, said clutch member having a peripheral flange provided with openings therein, a rotary element, a dog pivoted on said element, said dog having a hook-shaped portion adapted to travel on said flange until it engages one of said openings, each opening being provided with a beveled portion to be engaged by the hook-shaped portion of the dog, and means for engaging said dog to move it backward out of engagement with the bevel-shaped portions of said openings, and a spring for forcing the dog into said openings.

5. In a planting machine, a rotary seed-shaft, a clutch member secured thereon, said clutch member having a flange provided with openings therein, a rotary element which is loose on said shaft, a dog pivoted on said rotary element, adapted to engage said openings, a spring controlling said dog, whereby the dog rides on the flange until it encounters one of said openings, means for engaging said dog to disengage the same from said openings, said means involving a cam for causing said dog to skip one or more of said openings, and mechanism for changing the position of said cam, whereby the extent of rotation of the shaft may be varied at will.

Signed by me at Rock Island, Illinois, this 30th day of April 1910.

JOHN TEDELL.

Witnesses:
 LUCIA TULLER,
 H. DETJENS.